United States Patent [19]
Sitton

[11] 3,773,152
[45] Nov. 20, 1973

[54] ENERGY STORAGE ASSEMBLY

[75] Inventor: Ellis A. Sitton, East Peoria, Ill.

[73] Assignee: Caterpillar Tractor Co., Peoria, Ill.

[22] Filed: Mar. 24, 1972

[21] Appl. No.: 237,747

[52] U.S. Cl. ................................. 188/170, 267/162
[51] Int. Cl. ........................................... F16d 59/02
[58] Field of Search ................... 188/72.3, 170, 171; 192/70.27, 70.28, 89 B; 267/161, 162

[56] References Cited
UNITED STATES PATENTS

| | | |
|---|---|---|
| 3,010,713 | 11/1961 | Turkovich .......................... 267/162 |
| 3,147,961 | 9/1964 | Kowalski ............................ 267/162 |
| 3,417,843 | 12/1968 | Trollope ............................ 188/170 |

Primary Examiner—Duane A. Reger
Attorney—Donald C. Feix

[57] ABSTRACT

An energy storage assembly disposable between a pair of movable members includes a spring formed from sheet material normally urging the movable members apart. A wear member is interposed between the spring and the movable members to absorb wear and includes a stop portion disposed in motion limiting relation to the pair of movable members.

4 Claims, 2 Drawing Figures

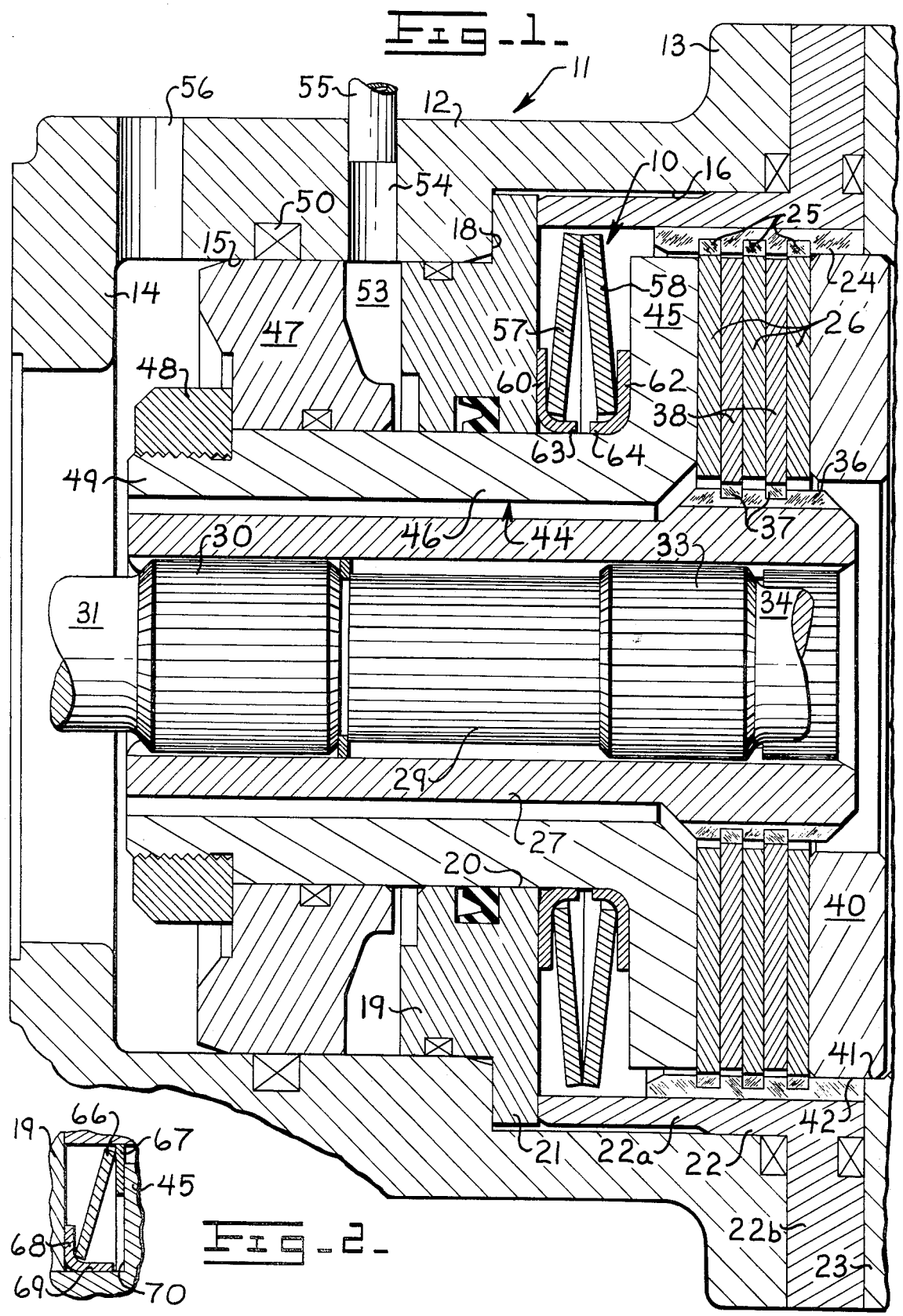

ENERGY STORAGE ASSEMBLY

BACKGROUND OF THE INVENTION

Leaf springs and conical spring washers, commonly designated as Belleville springs, are commonly used for biasing a pair of relatively movable members. These springs, although relatively inexpensive and compact, have a common disadvantage which precludes their use in many applications which would otherwise be desirable.

Springs of this type are generally formed from flat sheet material with their resiliency or spring characteristics being provided by resistance to return to their original flat shape. With the springs disposed in angular relation between the movable members and a compressive force applied thereto, the springs are urged toward their original flat configuration and approach a more parallel relation with respect to the surfaces of the members which are engaged by the spring. This change in angular relationship results in sliding movement between the springs and the movable members and can result in considerable wear in frequently actuated mechanisms of this type. In many applications such as brakes and clutches, the movable members are precision-machined, relatively expensive, members such that frequent replacement of such members due to wear would be highly undesirable.

As heretofore used, springs of this type are generally placed in direct load-bearing sliding contact with the movable members without any protection against wear of those relatively expensive elements.

It is also important to avoid over-stressing of springs of this type due to excessive compression. Normal practice is to provide machined stop surfaces on the relatively movable members. This is, in many instances, inconvenient due to the configuration of the movable members and normally requires additional machining.

SUMMARY AND OBJECTS OF THE INVENTION

An object of this invention is to provide an improved energy storage assembly of the type including a spring formed from sheet material.

Another object of this invention is to provide an improved energy storage assembly utilizing a spring formed from sheet material which protects the movable members of the assembly from excessive wear.

Another object of this invention is to provide an improved energy storage assembly including a spring formed from sheet material and having a wear member interposed between the spring and the movable members and which includes an integral stop portion disposed in motion-limiting relation to the movable members to avoid excessive compression and consequent damage to the spring.

Other objects and advantages of the present invention will become more readily apparent upon reference to the accompanying drawings and following description.

BRIEF DESCRIPTION OF THE DRAWING

FIG. 1 is a cross-sectional view of an energy storage assembly embodying the principles of the present invention operationally disposed in a brake; and FIG. 2 is a fragmentary sectional view illustrating an alternate embodiment of the present invention.

DESCRIPTION OF THE PREFERRED EMBODIMENT

Referring more particularly to the drawing, an energy storage assembly embodying the principles of the present invention is generally indicated by the reference numeral 10 in operative association with a friction brake generally designated by the reference numeral 11.

The brake 11 includes a tubular housing 12 having a radially outwardly extending annular mounting flange 13 formed on one end and a radially inwardly directed annular mounting flange 14 integrally formed on the other end of the housing.

The inner surface of housing 12 is defined by a bore 15, a portion of which includes a counterbore 16 of somewhat larger diameter to define a radially extending shoulder 18.

An annular ring 19 having a central bore 20 is telescopically disposed in bore 15 and includes a radially extending flange 21 disposed in axial engagement with shoulder 18. The ring 19 provides a reaction abutment for the energy storage assembly 10.

An adapter member 22 has an axially extending tubular portion 22a which is telescopically disposed in counterbore 16 with one end in abutting, axially confining relation to flange 21.

An annular radially extending flange 22b is formed at the other end of the adapter and is disposed in clamping relation between the flange 13 of housing 12 and a mounting member 23 to which the housing is secured by any suitable means. The adapter further includes an internal spline 24 for driving engagement with an external spline 25 provided around the outer periphery of a plurality of annular radially inwardly extending brake discs 26.

An elongated braking member 27 is disposed in telescopic substantially concentric relation to housing 12 and has an internal spline 29 for driving connection with the externally splined portion 30 of a rotatable input shaft 31 and the externally splined portion 33 of an output shaft 34.

An external spline 36 is provided adjacent one end of the braking member and drivingly engages an internal spline 37 provided at the inner periphery of a plurality of annular radially outwardly extending brake discs 38.

Brake discs 38 are disposed in radially overlapping, inter-leaved relation to the brake disc 26 so as to provide substantial areas therebetween for frictional engagement under pressure to retard relative rotation of braking member 27 and housing 12.

A brake back plate 40 in the form of an annular ring is disposed in a counterbore 41 provided in the mounting member 22. The backing plate extends axially outward of the mounting member 23 so as to present a circumferential piloting portion 42 for piloting sliding fit engagement with the inner peripheral surface of adapter 19 to establish the concentric relationship of housing 12 with respect to the input shaft 31 and output shaft 34.

A brake actuator 44 includes a radially outwardly extending annular pressure plate portion 45 and a tubular axially extending portion 46 disposed in sealed slidable relation to the bore 20 of the reaction abutment 19.

An annular piston 47 is disposed in a telescopic sealed relation with the tubular portion 46 of the member 44 and is retained thereon by a nut 48 threadably engaging a threaded portion 49 of the member 44. The piston 47 has a sliding fit with the bore 15 of the housing 12 and is sealed by a seal 50.

A chamber 53 defined by the bore 15, the piston 47, the member 44 and the reaction abutment 19 may be selectively pressurized by introduction of pressure fluid through a passage 54 and a conduit 55 from a suitable source, not shown, for powered axial movement of the member 44.

A passage 56 provided in the housing 12 permits any fluid leakage from the chamber 53 (or a motor, not shown, drivingly attached to the input shaft 31) to be returned to a sump.

The brake 11 is of the spring engaged, pressure disengaged type to permit the brake to engage automatically at any time the chamber 53 is not pressurized. Forr this purpose, the energy storage assembly 10 is disposed between reaction abutment 19 and the pressure plate portion 45 of actuator member 44.

In the specific embodiment shown in FIG. 1, the energy storage assembly 10 includes a pair of conical spring washers 57 and 58. The spring washers are serially disposed so as to form in cross section a substantially V-shape wherein the respective outer peripheral portions of the washers are in direct load bearing contact. The inner peripheral portions are disposed in load bearing relation to the reaction abutment 19 and pressure plate 45.

In the assembled condition illustrated, the spring washers 57 and 58 are compressed a predetermined amount so as to urge the actuator member 44 toward back plate 40 and thus bring the brake discs 26 and 38 into loaded frictional engagement to retard relative rotation between the braking member 27 and the housing 12.

The conical spring washers 57 and 58 are manufactured by forming flat annular rings to the conical shape illustrated which results in the washers being angularly disposed with respect to each other and to the opposing surfaces of the members to be actuated. With this arrangement as the springs are compressed toward their original flat condition, the point of load bearing contact with the members associated therewith must necessarily move radially inwardly.

As the springs are again extended or relaxed, the point of load bearing contact shifts radially outward such that relative sliding movement occurs between the spring washers and their point of contact with the relatively movable members. In a frequently actuated friction couple mechanism such as a brake or a clutch, such heavily loaded sliding movement can result in excessive wear.

Since the actuator member 44 and reaction abutment 19 are relatively large, precision-machined components, excessive wear could require frequent, expensive replacement of those components.

In order to avoid such undesirable wear on the actuator and reaction abutment a pair of annular wear washers 60 and 62 are interposed respectively between the inner peripheral portions of the spring washers 57 and 58 and the opposed annular surfaces of pressure plate 45 and reaction abutment 23.

The wear washers further include integrally formed tubular stop portions 63 and 64 individually axially extending to an opposed predetermined spaced relation so as to limit movement of pressure plate 45 toward reaction abutment 23. Maximum compression of the conical spring washers 57 and 58 is thus limited to avoid excessive compression and resultant damage.

An alternate embodiment of the present invention is illustrated in FIG. 2.

In this embodiment a single conical spring washer 66 is disposed in biasing relation between the pressure plate 45 and reaction abutment 19. An annular wear washer 67 is interposed between an outer peripheral edge of the spring washer and a pressure plate 45. A formed wear washer 68 is interposed between an inner peripheral edge of spring washer 66 and the reaction abutment. The wear washer 68 includes an axially extending tubular stop portion 69.

With the spring washer in an assembled extended condition, the stop portion 69 is spaced a predetermined distance from an axially facing opposed surface 70 of pressure plate 45. As the pressure plate is moved to the left, as viewed in FIG. 2, the surface 70 abuts the stop portion 69 to limit compression of the spring washer and to prevent damage.

The wear washers 60 and 62 provide replaceable relatively inexpensive wear surfaces for direct load bearing sliding contact with the inner peripheral portions of the spring washers 57 and 58. With this arrangement, as wear on the washers becomes excessive so as to change the preload of spring washers 57 and 58 (and thereby the engaging force on the brake discs), the washers may be inexpensively replaced to restore the energy storage assembly to its original condition.

OPERATION

While the operation of the present invention is believed clearly apparent from the foregoing description, further amplification will subsequently be made in the following brief summary of such operation.

As previously mentioned, the brake is normally engaged since the energy storage assembly 10 resiliently biases the pressure plate 45 toward the back plate 40 to generate loaded frictional contact between the brake discs 26 and 38. This engaged condition of the brake results in the braking member 27 being locked in relative non-rotative relation to housing 12 so as to avoid unintentional relative rotation therebetween.

When it is desired to allow the braking member 27 to rotate relative to the housing 12, it is necessary to disengage the brake by compressing the energy storage assembly and thus to reduce the frictional engagement between the discs 26 and 38. This is accomplished by introducing fluid pressure to the chamber 53 which urges the piston 47 and hence the actuator member 44 to the left (as viewed in the drawing) to compress the conical spring washers 57 and 58 and to relieve the axially loaded engagement of the brake discs.

In view of the foregoing, it is readily apparent that the structure of the present invention provides an improved energy storage assembly which protects the relatively expensive movable members associated therewith from excessive wear and integrally includes a stop member for limiting compression of the energy storage assembly.

While the invention has been described and shown with particular reference to the preferred embodiments, it will be apparent that variations might be possible that would fall within the scope of the present invention which is not intended to be limited except as defined in the following claims.

What is claimed is:

1. A spring biased assembly comprising,
a pair of relatively movable members having opposed annular surfaces disposed in spaced relation, said movable members constituting a pressure plate and a reaction abutment of a friction couple actuator, said friction couple actuator comprising a housing supporting a first friction element in relatively non-rotative relation thereto and a braking member supported in substantially coaxial relatively rotatable relation to said housing and drivingly supporting a second friction element for selective pressure engagement with said first friction element for retarding or preventing relative rotation between said housing and said braking member,
a plurality of conical spring washers disposed in axially biasing relation between said annular surfaces and having a peripheral edge in load bearing relation to each of said annular surfaces, said purality of conical spring washers being serially disposed so as to form a generally V-shaped in cross section, said spring washers resiliently biasing said pressure plate in a selected direction with respect to said friction elements, and
a pair of wear washers, one interposed between said spring washers and one of said annular surfaces and the other interposed between said spring washers and the other of said annular surfaces to provide replaceable wear surfaces, said wear washers each including a tubular stop portion of sufficient length to provide a predetermined space between the spaced ends of the washers when said conical spring washers are in an assembled compressed condition to provide a stop limiting movement of said members toward each other.

2. The spring biased assembly of claim 1 wherein said friction couple further comprises;
fluid motor means operatively connected to said pressure plate for powered movement thereof in opposition to said spring washers; and
said selected biasing direction of said spring washers being in a friction couple engaging direction.

3. A spring biased assembly comprising,
a pair of relatively movable members having opposed annular surfaces disposed in spaced relation,
a plurality of conical spring washers disposed in axially biasing relation between said annular surfaces and having a peripheral edge in load bearing relation to each of said annular surfaces,
a hardened wear washer interposed respectively between each said peripheral edge and annular surface at said load bearing point to provide a replaceable wear surface, at least on hardened washer integrally including a tubular stop portion extending axially a predetermined distance between said annular surfaces to control movement of said members toward each other and limit maximum compression of said spring washers in order to avoid excessive compression and resultant damage thereof.

4. The spring biased assembly of claim 3 wherein said conical spring washers are serially arranged to form a generally V-shape in cross section.

* * * * *